United States Patent [19]

Haraikawa et al.

[11] 4,360,082
[45] Nov. 23, 1982

[54] DISC BRAKE

[75] Inventors: Tetsuo Haraikawa, Funabashi; Hiroshi Ito, Kawasaki; Koichi Tamura, Tokyo, all of Japan

[73] Assignee: Tokico Ltd., Kawasaki, Japan

[21] Appl. No.: 170,874

[22] Filed: Jul. 21, 1980

[30] Foreign Application Priority Data

Jul. 20, 1979 [JP] Japan .................................. 54-92182

[51] Int. Cl.³ ............................................. F16D 65/02
[52] U.S. Cl. ................................... 188/73.45; 188/344
[58] Field of Search ................. 188/72.4, 73.31, 73.43, 188/73.44, 73.45, 344

[56] References Cited

U.S. PATENT DOCUMENTS

| | | | |
|---|---|---|---|
| 4,022,297 | 5/1977 | Haraikawa | 188/344 X |
| 4,084,666 | 4/1978 | Karasudani | 188/73.45 |
| 4,109,766 | 8/1978 | Inoue et al. | 188/73.45 X |
| 4,215,768 | 8/1980 | Seki | 188/73.45 |
| 4,222,464 | 9/1980 | Moriya et al. | 188/73.44 |

*Primary Examiner*—Duane A. Reger
*Attorney, Agent, or Firm*—Wenderoth, Lind & Ponack

[57] ABSTRACT

A disc brake including a caliper member slidably supported on a stationary member, at least one pin provided on either of the caliper member and a stationary member, and a guide member mounted on the other of the caliper member and the stationary member and slidably engaging with the pin. A guide portion provided on the other of the caliper member and the stationary member and detachably mounting the guide member. The guide member can be detached from the guide portion by displacing the guide member in a direction transverse to the axis of the pin.

5 Claims, 4 Drawing Figures

1

DISC BRAKE

BACKGROUND OF THE INVENTION

This invention relates to improvements in disc brakes and particularly to disc brakes of the type including a stationary member, a caliper member slidably supported on the stationary member, and at least one pin provided on either the caliper or the stationary members for guiding the sliding movement of the caliper.

Some disc brakes for use in two-wheeled vehicle such as motor-cycles have the caliper member directly mounted on a member constituting the body of the vehicle, such as the front or rear fork of the vehicle, so as to slide relative thereto. In such case, when the caliper member is not assembled with the body of the vehicle or when the caliper member is dismounted from the body of the vehicle, the portion on which the caliper member slides relative to the body of the vehicle will be exposed. Accordingly, it has been required to adequately protect the sliding portion. Further, the sliding portion has usually been lubricated with a lubricating agent such as grease and the exposed portion of the sliding portion has usually been protected by means such as a dust boot. Thus the assembling or the dismounting operation is troublesome and time-consuming. Further, the caliper member has usually been mounted on the vehicle on two parallel pins, and it has been required to remove two pins for dismounting the caliper member from the vehicle, thereby doubling the troublesome operation.

SUMMARY OF THE INVENTION

The present invention seeks to eliminate the above described shortcomings and, according to the invention, at least one pin provided on either the caliper member or the stationary member is slidably supported on a guide member which is mounted on the other of the caliper member or the stationary member and is adapted to be dismounted therefrom by displacing the guide member in a direction transverse to the axis of the pin.

Preferably, a generally U-shaped recess is formed in the stationary member for receiving a sleeve-like shaped guide member which slidably receives a pin secured to the caliper member.

BRIEF DESCRIPTION OF THE DRAWINGS

The invention will hereinafter be explained in detail with reference to the accompanying drawings exemplifying a preferred embodiment of the invention, in which.

DETAILED DESCRIPTION OF THE PREFERRED EMBODIMENTS

Figure 1:
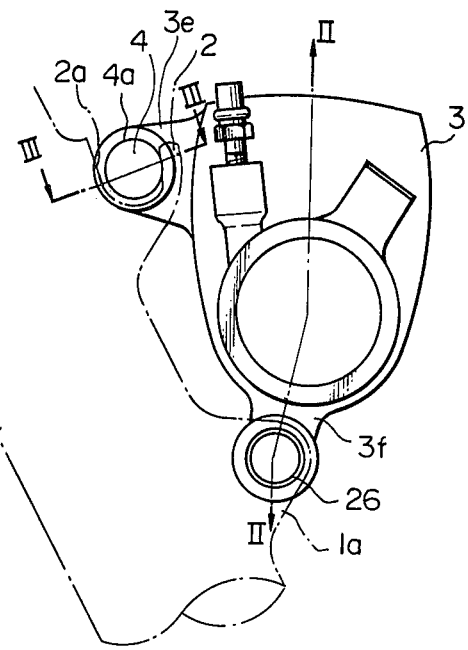
FIG. 1 is a side view of a disc brake according to the invention.

The disc brake shown in the drawings is mounted directly on a portion of a two-wheeled vehicle, and fork 1 constitutes the stationary member of the disc brake. There are provided, according to the invention, a generally U-shaped lug 2 and another lug 1a on the fork 1 for mounting the disc brake thereon.

The disc brake mainly comprises a caliper 3 incorporating therein a piston 11 and a pair of friction pads 18 and 19.

The caliper 3 generally has an inverted U-shaped conventional configuration with one limb portion 3a extending on one side of a rotatable disc 9, another limb portion 3c disposed on the other side of the disc 9, and a bridge portion 3b disposed on the outer circumference of the disc 9 and connecting the limb portions 3a and 3c. In the limb portion 3a, there is formed a cylinder 10 which operatively receives the piston 11. An annular piston seal 13 is received in an annular groove 12 formed in the cylinder 10. A dust boot 14 is provided between the cylinder 10 and the piston 11 to protect the sliding surfaces therebetween.

Figure 2:
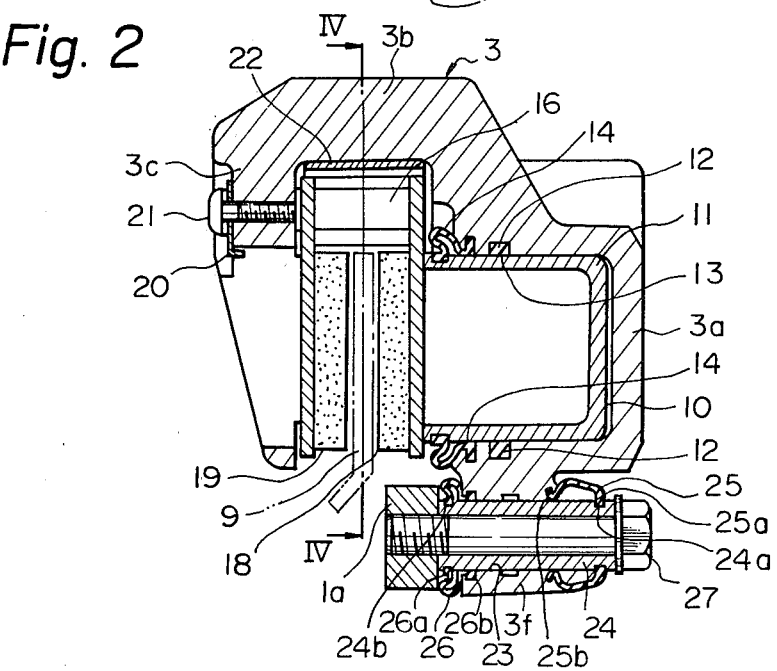
FIG. 2 is a sectional view taken along line II—II in FIG. 1.
Figure 3:
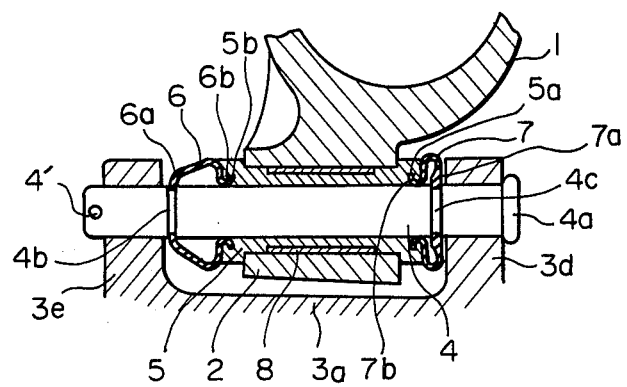
FIG. 3 is a sectional view taken along line III—III in FIG. 1.
Figure 4:
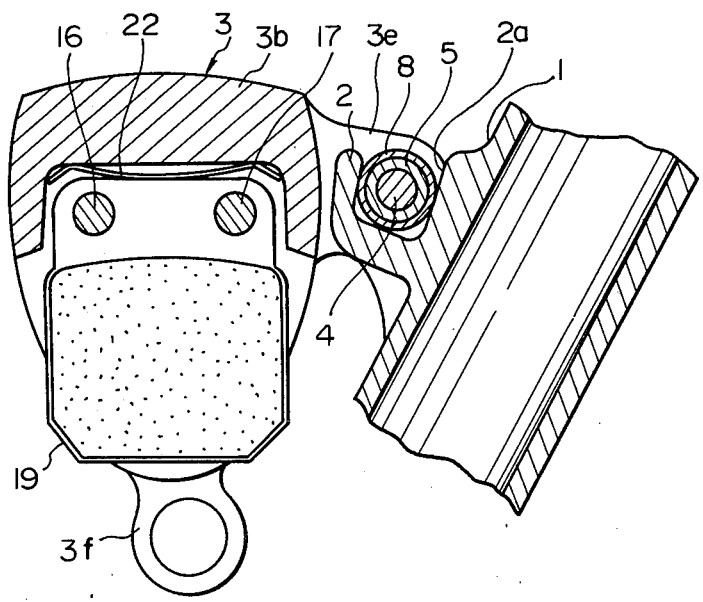
FIG. 4 is a sectional view taken along line IV—IV in FIG. 2.

As shown in FIG. 2, the friction pad 18 is disposed between the piston 11 and the disc 9, and the friction pad 19 is disposed between the limb portion 3c and the disc 9. For retaining the friction pads 18 and 19, there are provided two parallel pins 16 and 17 which extend between the limb portions 3a and 3c. The pins 16 and 17 are retained on respective positions by screws 21 (only one is shown in FIG. 2) and a retaining plate 20. A pad spring 22 is provided between the inner surface of the bridge portion 3b of the caliper 3 and the friction pads 18 and 19.

In applying the brake, pressurized oil is supplied into the cylinder 10 to displace the piston 11 toward the disc 9, thereby pressing the friction pad 18 against the disc 9. The reaction force acting on the cylinder 10 displaces the caliper 3 relative to the stationary member 1 in the direction opposite to the displacement of the piston 11, whereby the limb portion 3c presses the friction pad 19 against the disc.

According to the invention, there are formed on the limb portion 3a of the caliper 3 two spaced lugs or arm portions 3d and 3e for mounting therebetween a pin 4. The pin 4 is fixedly mounted by a retaining pin 4'. A hollow sleeve 5 slidably engages with the pin 4, and dust boots 6 and 7 cover and protect the sliding surfaces between the pin 4 and the sleeve 5. The one ends 6a and 7a of the dust boots 6 and 7 engage respectively with annular grooves 4b and 4c in the pin 4, and the other ends 6b and 7b of the dust boots 6 and 7 engage respectively with annular grooves 5b and 5a in the sleeve 5. The sleeve 5 constitutes the guide member according to the invention.

The sleeve 5 is mounted on the U-shaped lug 2 of the stationary member according to the invention. The lug 2 has a recess 2a which opens in the upward direction as viewed in FIG. 1, however, the recess 2a may open in any desired direction transverse to the axis of the pin 4. The relative movement between the lug 2 and the sleeve 5 is restricted by any desired technique. In the embodiment, annular flanges are formed on the outer circumference of the sleeve 5 to engage with opposite side surfaces of the lug 2. The lug 2 constitutes a guiding portion according to the invention on which is detachably mounted a guide member in the form of sleeve 5. In the embodiment, the guiding portion 2 has a generally U-shaped form as viewed along the axis of the pin 4. A resilient bushing 8 is positioned between the sleeve 5 and the lug 2.

Another lug or arm portion 3f is formed on the limb portion 3a of the caliper 3 at a location spaced from the arm portions 3d and 3e. A through bore 23 is formed in the arm portion 3f for slidably receiving a hollow sleeve 24. Dust boots 25 and 26 cover and protect the sliding surfaces of the bore 23 and the sleeve 24. Each of one ends 25a and 26a of the dust boots 25 and 26 are respectively engaged in annular grooves 24a and 24b in the sleeve 24, and the other ends 25b and 26b of the dust boots 25 and 26 are respectively engaged in annular grooves formed in the arm portion 3f.

A bolt 27 passing through the hollow sleeve 24 threadingly engages with internal threads formed in lug 1a. Thus, the caliper 3 is mounted on the fork 1 and is slidable relative thereto in the direction of the axis of the pin 4 and the axis of the sleeve 24 which are parallel to the axis of the disc 9.

In mounting the caliper 3 on the vehicle, the sleeve 5 and the pin 4 with dust boots 6 and 7 being assembled therewith are mounted on the arm portions 3d and 3e of the caliper 3, and the sleeve 24 is fitted in the bore 23 of the arm portion 3f with dust boots 25 and 26 being assembled therewith. The sleeve 5 is fitted in the recess 2a of the lug 2 by displacing the caliper 3 in a direction transverse to the axis of the disc 9, the caliper 3 is rotated around the axis of the pin 4 so that the threaded bore in the lug 1a is aligned with the axis of the sleeve 24. The bolt 27 is inserted through the sleeve 24 and is secured to the lug 1a so that the sleeve 24 is secured to the lug 1a.

In dismounting the caliper 3 from the vehicle, the bolt 27 is removed, then, the sleeve 5 can very easily be removed from the fork 1 by simply displacing the sleeve 5 (and the caliper 3) in a direction transverse to the axis of the pin or toward the opening of the recess 2a. The caliper 3 is dismounted from the fork 1 with dust boots 6, 7, 25 and 26 being in the assembled condition. Thus the dismounting operation is very simple and easy, and sliding portions for effecting the sliding movement of the caliper with respect to the fork 1 are adequately protected.

In the embodiment, the lug 2 for detachably mounting the guide member is provided on the fork 1, alternatively, a pair of arm portions for supporting the pin 4 therebetween may be provided on the fork 1, with the sleeve 5 acting as the guide member being slidably mounted on the pin. A lug defining a recess for detachably receiving the sleeve is formed in the caliper. However, the arrangement shown in the drawing is preferable since the parts effecting the sliding movement of the caliper can be dismounted together with the caliper and friction pads as an assembly from the body of the vehicle. Thus it is very easy to perform a repair and maintenance operation.

In the embodiment, the guide portion on which is detachably mounting the guide member for movement in the direction transverse to the axis of the pin is integrally formed on the body of the vehicle which constitutes the stationary member of the disc brake. However, the guide portion may be formed on a member separate from the body of the vehicle and which is secured thereto.

As described heretofore, according to the invention, the guide member guiding the sliding movement of the caliper is removably mounted on the guide portion for movement in the direction transverse to the axis of the pin, whereby the mounting or dismounting operation of the disc brake can easily and quickly be performed, and the sliding portions can be reliably protected during the mounting or dismounting operation.

What is claimed is:

1. A disc brake comprising: a caliper member; a stationary member on which said caliper member is slidably supported; at least one pin provided on one of said members; and a guide on the other of said members and in which said pin is slidably supported for axial sliding movement in said guide, said guide being removably mounted on said other member for displacement relative to said other member in a direction transverse to the axis of said pin while said pin remains in said guide.

2. A disc brake as claimed in claim 1 in which said other member has a guiding portion thereon having a generally U-shaped form as viewed along the axis of said pin, said guide being movable into and out of said U-shaped guiding portion.

3. A disc brake as claimed in claim 1 in which said guide comprises a hollow sleeve having said pin slidable therein.

4. A disc brake as claimed in claim 3 in which said other member has a guiding portion thereon having a generally U-shaped form as viewed along the axis of said pin, said guide being movable into and out of said U-shaped guiding portion.

5. A disc brake as claimed in claim 1 further comprising a second sleeve and a bolt extending therethrough and parallel to said pin and threaded into said stationary member and securing said second sleeve to said stationary member, said caliper member having an opening through which said second sleeve passes and said caliper being slidable on said second sleeve.

* * * * *